United States Patent [19]

Sakurai

[11] 4,264,133
[45] Apr. 28, 1981

[54] ANTI-REFLECTIVE COATING FOR A TRANSPARENT SUBSTRATE

[75] Inventor: Kunio Sakurai, Hachioji, Japan

[73] Assignee: Konishiroku Photo Industry Co., Ltd., Tokyo, Japan

[21] Appl. No.: 908,912

[22] Filed: May 24, 1978

Related U.S. Application Data

[63] Continuation-in-part of Ser. No. 641,671, Dec. 17, 1975, abandoned, which is a continuation-in-part of Ser. No. 381,749, Jul. 23, 1973, abandoned.

[30] Foreign Application Priority Data

Jul. 27, 1972 [JP] Japan .................. 47-75744

[51] Int. Cl.$^3$ .................................................. G02B 5/28
[52] U.S. Cl. ........................................................ 350/164
[58] Field of Search ................................ 350/163–166, 350/1.6

[56] References Cited

U.S. PATENT DOCUMENTS

| | | | |
|---|---|---|---|
| 3,176,575 | 4/1965 | Socha | 350/164 |
| 3,737,210 | 6/1973 | Howe | 350/164 |
| 3,738,732 | 6/1973 | Ikeda | 350/164 |
| 3,781,090 | 12/1973 | Sumita | 350/164 |
| 3,960,441 | 6/1976 | Kamiya et al. | 350/164 |
| 4,128,303 | 12/1978 | Onoki et al. | 350/164 |

Primary Examiner—Ronald J. Stern
Attorney, Agent, or Firm—Bierman & Bierman

[57] ABSTRACT

In a two or three anti-reflection coating, a $\lambda°/2$ layer is replaced by a composite layer.

The composite layer is characterized by a higher equivalent inhomogeneity $\phi'$ than the inhomogeneity $\phi$ of the $\lambda°/2$ layer.

9 Claims, 15 Drawing Figures

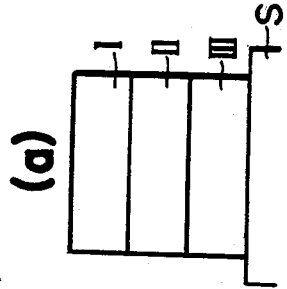
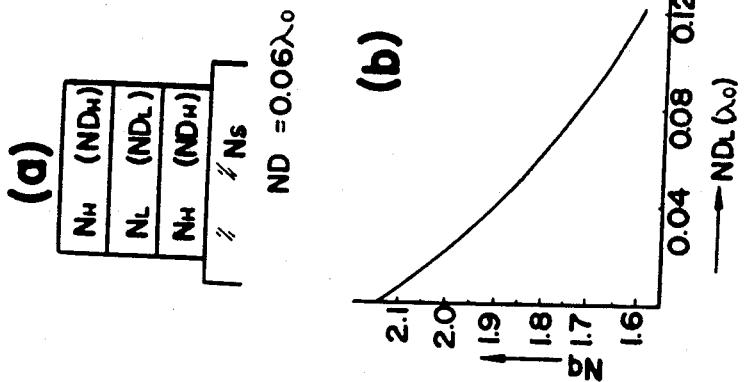
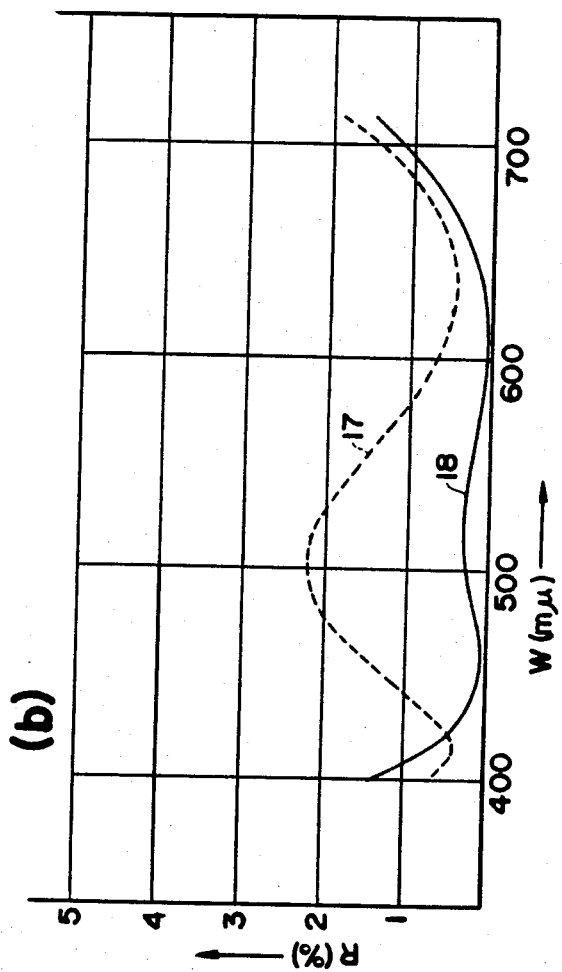
FIG. 10
FIG. 11

ANTI-REFLECTIVE COATING FOR A TRANSPARENT SUBSTRATE

This application is a continuation-in-part application of co-pending U.S. application Ser. No. 641,671 filed Dec. 17, 1975, now abandoned, which in turn is a continuation-in-part application of U.S. application Ser. No. 381,749 filed July 23, 1973, now abandoned, which claims the priority of Japanese Application Ser. No. 75744 filed July 27, 1972.

BACKGROUND OF THE INVENTION

The present invention relates to anti-reflection coatings.

Anti-reflection coatings are applied to transparent substrates such as optical components with a view of reducing the reflection of light of a predetermined wave lengths at the substrate surface.

Usually it is desired to reduce reflection from the substrate at more than one wave length, for example over a band of wave lengths.

Among prior basic proposals are coatings comprising two and three layers; the two layer coating comprises outer and inner layers having thicknesses of $\lambda o/4$ and $\lambda o/2$ respectively, where $\lambda o$ is a wave length lying within a band-width over which reflection is to be reduced, while the three layer coating has layers of thickness $\lambda o/4$, $\lambda o/2$, $\lambda o/4$ respectively.

These coatings are satisfactory to meet theoretical anticipation and requirements.

However, it has not been possible to obtain anti-reflection coatings just same as the theoretical anticipations in industrial processes. Thus, anti-reflection performance is greatly reduced due to the difference between actually manufactured coating and those theoretically anticipated.

It was found that the difference was mainly brought about by heat utilized in the coating process. In the coating process, it is required to heat a substrate to a certain high temperature in order to increase mechanical strength of the coatings. When so heated, it is observed that the coating is made inhomogeneous in refractive index. This phenomenon is conspicuous when layers are thick. For example, in a case of a zirconium oxide layer which is popularly used as a substance for a thick and high-refractive index layer, refractive indeces of the layer decreases from a substrate side to an air side as the thickness of the layer increases. It is also observed that when the $\frac{1}{2}\lambda o$ layer of the two layer or three layer anti-reflection coating was inhomogeneous in refractive index, reflection from the optical component was greatly elevated, so that anti-reflection performance was unsatisfactory for practical use.

Such defect is difficult to overcome by controlling of vacuum evaporation and hence satisfactory anti-reflection coatings have not been obtained.

SUMMARY OF THE INVENTION

An object of this invention is to provide anti-reflection coatings greatly reducing reflectances over a wide band of wave lengths.

In order to attain these objects, in this invention, $\lambda o/2$ layers in the two and three layer anti-reflection coatings are replaced by composite layers comprising basic layers and inhomogeneity adjusting layers.

BRIEF DESCRIPTION OF THE DRAWINGS

FIGS. 9 to 15 show embodiments of this invention and characteristics in reflection of these embodiments.

DETAILED DESCRIPTION OF THE INVENTION

In accordance with this invention, two and three layer anti-reflection coatings are provided. The two layer anti-reflection coating comprises a $\lambda o/2$ composite layer and a $\lambda o/4$ layer which are deposited on a substrate in this order. The three layer anti-reflection coating comprises a $\lambda o/4$ layer, a $\lambda o/2$ composite layer and a $\lambda o/4$ layer which are deposited on a substrate in this order.

All of the $\lambda o/4$ layers are of conventional ones and can be deposited by known manner. Novelty of this invention resides in the composite layers.

How the $\lambda o/2$ composite layers are formed will be explained hereinafter.

The properties of the $\lambda o/2$ composite layers are determined on the basis of the properties of an optical component consisting of a substrate and a single $\lambda o/2$ layer thereon.

Figure 1:
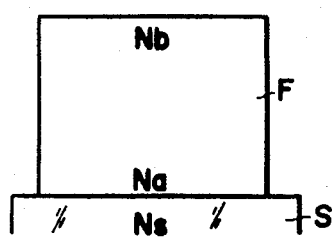
FIG. 1 is a diagrammatic cross section representation of a coating consisting of a single layer.

First, inhomogeneity $\phi$ is discussed. The inhomogeneity $\phi$ is given by the following equation 1

$$\phi = (Nb/Na) \qquad 1$$

wherein Na and Nb are refractive indices respectively at a substrate or inner side and at an air or outer side of a coating deposited on a substrate and having a thickness of $\lambda o/2$, the coating being shown in FIG. 1.

When the coating is homogeneous in refractive index, $\phi$ is equal to 1, while when the coating is inhomogeneous, $\phi$ is unequal to 1. Particularly, when the coating is heat-treated, $\phi$ generally becomes smaller than 1. Especially, in case of a zirconium oxide layer, the inhomogeneity $\phi$ becomes 0.93 by heating the substrate at about 300° C. $\phi$ is also given by the following equation 2.

$$\partial = \frac{1 + \sqrt{Rmin}}{Ns(1 - \sqrt{Rmin})} \qquad 2$$

wherein Ns is the refractive index of the substrate.
Rmin will be explained below.

With respect to a certain wave length $\lambda o$, reflectance of an optical coating which consists of a substrate and a single layer thereon relates to the thickness of the single layer. The relationship between the reflectance and the thickness is shown in FIG. 2.

Figure 2:
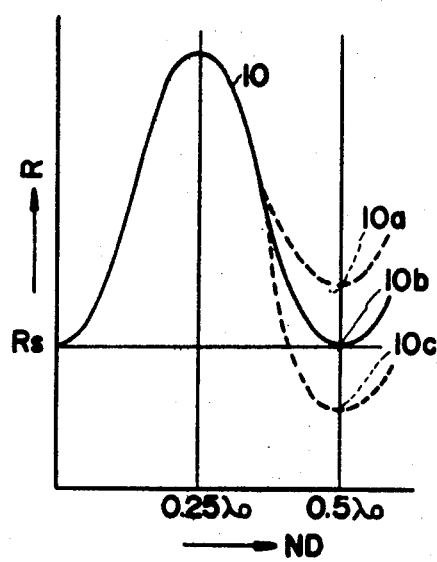
FIG. 2 shows reflectance of coatings.

Optical elements which exhibit reflectances shown in FIG. 2 consist of a substrate and a single layer having refractive index or indices higher than that of the substrate, which is, for example shown in FIG. 1. In the case that refractive index or indices of the single layer is higher than that of the substrate, reflectance exhibits a maximum value at a thickness of $\lambda o/4$ and a minimum value at a thickness of $\lambda o/2$.

In FIG. 2, a curve 10a represents reflectances from an optical component consisting of a substrate and an inhomogeneous single layer thereon in which $\phi$ is greater than 1, a curve 10b represents reflectances from an optical component consisting of a substrate and a homogeneous single layer thereon, that is, $\phi = 1$ and a curve 10c represents reflectances from an optical component consisting of a substrate and an inhomogeneous single layer thereon in which $\phi$ is smaller than 1.

The minimum reflectance Rmin is defined as reflectances at the thickness of $\lambda o/2$.

Rmin can be obtained through measurement of the optical components and hence $\phi$ can be obtained from the equation 2 if Rmin is known. Further, the refractive indices Na and Nb can be obtained from the equation 1 if $\phi$ is known, as follows.

$$\overline{N} = \frac{2NaNb}{Na + Nb} \qquad 3$$

wherein $\overline{N}$ is an average refractive index of the single layer. The average refractive index $\overline{N}$ can be obtained through known measuring process with use of ellipsometers.

From the equations 1 and 3, Na and Nb are obtained. Na and Nb thus obtained are used for determining properties of the composite layer.

Processes of determining the properties of the composite layer will be explained hereinbelow.

If Na and Nb are obtained, the distribution of the refractive indices of the single layer along a direction perpendicular to the surface of the single layer can be determined with an assumption that the refractive indices change linearly along the direction. Thus, characteristics in refractive index of the single layer are completely cleared.

It can be said that the refractive indices at a substrate side at and an air side of single layers having any thickness within a range of 0 to $\lambda o/2$ are determined by use of the distribution, provided that the last-mentioned single layers are deposited on substrates under the same conditions as these for depositing the former-mentioned single layer which has a thickness of $\lambda o/2$ and hence exhibits a minimum reflectance.

The deposition conditions include temperature, degree of vacuum and gas substance in a vacuum deposition chamber, rate of deposition, material of the substrate and material or materials to be deposited.

Next, reflectances of the composite layer are studied. All of this study can be conducted through calculation using a computer.

The composite layer in this invention comprises a basic layer and an inhomogeneity adjusting layer.

The basic layer has a thickness greater than that of the inhomogeneity adjusting layer and is made of zirconium oxide.

The composite layer may have any of structures in one of which the basic layer is located at inner side of the inhomogeneity adjusting layer, and in the other of which the basic layer is located at outer side of the inhomogeneity adjusting layer. In both of the structures, the outer layer should have a higher refractive index or indeces than that or these of an inner layer.

In the above description, the characteristics in refractive indices and reflectances of the single layer having a thickness of $\lambda o/2$ were discussed and determined. The basic layer is deposited under the same conditions as these for the $\lambda o/2$ single layer. Therefor, the basic layer has the same refractive index distribution as that of the $\lambda o/2$ single layer. But, it should be noted that the basic layer has a smaller thickness than that of the $\lambda o/2$ single layer. This is attained by shortly changing deposition time.

Accordingly, characteristics in refractive indices of the basic layer is clearly determined.

Figure 3:
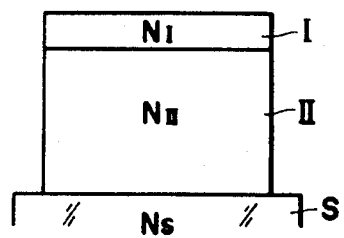
FIG. 3 is a diagrammatic cross section representation of a coating consisting of a composite layer.
Figure 7:
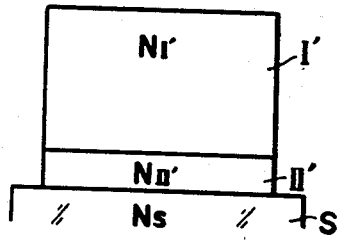
FIG. 7 is a diagrammatic cross section representation of a coating consisting of another composite layer.

Again referring to the structure of the composite layer used in this invention, the basic layer may be located at an inner side as shown in FIG. 3 and at an outer side as shown in FIG. 7.

First, explanation is made with reference to the former type.

Figure 4:
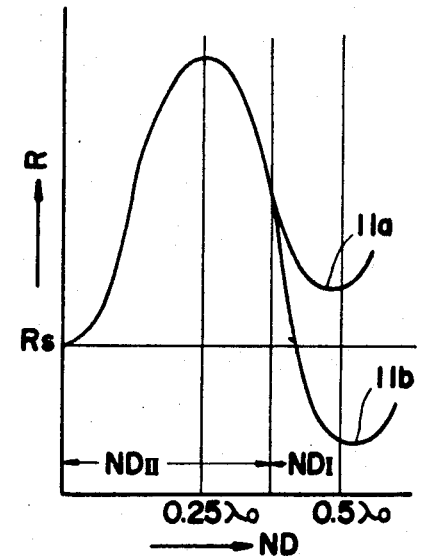
FIG. 4 shows reflectance of coatings.

On the basic layer whose characteristics are determined, an inhomogeneity adjusting layer is deposited. This inhomogeneity adjusting layer is assumed homogeneous in refractive index. This assumption was confirmed to be correct because this layer is thin. Reflectances from optical components consisting of substrates, the basic layer whose characteristics were determined and the inhomogeneity adjusting layers having various thicknesses are calculated. This calculation is conducted with reference to a certain wave length $\lambda o$ and a specific material for the inhomogeneity adjusting layer. A reflectance curve, for example 11a in FIG. 4 is obtained through this calculation. As shown in FIG. 4, the reflectance exhibits a maximum value at $\lambda o/4$ and minimum values in the vicinities of $\lambda o/2$.

This calculation can be conducted with use of an approximation theory as described in pages 188 to 190 of OPTICS OF THIN FILMS by A. Vasicek from NORTH-HOLLAND PUBLISHING COMPANY, published in 1960.

The calculation is repeated for various inhomogeneity adjusting layers made of various materials and having various refractive indices. Two examples of the results are shown in FIG. 4. In FIG. 4, a curve 11a represents reflections of optical components consisting of substrates, basic layers and inhomogeneity adjusting layers wherein the inhomogeneity adjusting layers have a greater refractive index than these of the basic layer, while a curve 11b represents reflectances of optical components in which inhomogeneity adjusting layers have a smaller refractive index than these of the basic layer.

The minimum reflectances of the composite layers as shown in FIG. 4 is termed R'min. An equivalent inhomogeneity $\phi'$ is defined by the following equation 4.

$$\phi' = \frac{1 + \sqrt{R'min}}{Ns(1 - \sqrt{R'min})} \qquad 4$$

It should be noted that $\phi'$ is a property of an optical component consisting of a substrate and the composite layer wherein the optical component exhibits a minimum reflectance (R'min). Further, it should be noted that R'mins are not always at $\lambda o/2$, as shown in FIG. 4.

As shown in FIG. 4 for example by a curve 11a, an optical component having a specific basic layer which is made of a specific material and a predetermined thickness, and a specific inhomogeneity adjusting layer made of a specific material has an R'min.

If the thickness of the basic layer is changed, the thickness of the inhomogeneity adjusting layer is also changed so that the optical component provides a minimum value.

Thus several combinations of the thicknesses of the basic and inhomogeneity adjusting layers which provide minimum reflectances are obtained, and hence a relationship between the thicknesses of the basic and inhomogeneity adjusting layers is established. This is, for example shown in FIG. 5 by a curve 12.

Figure 5:
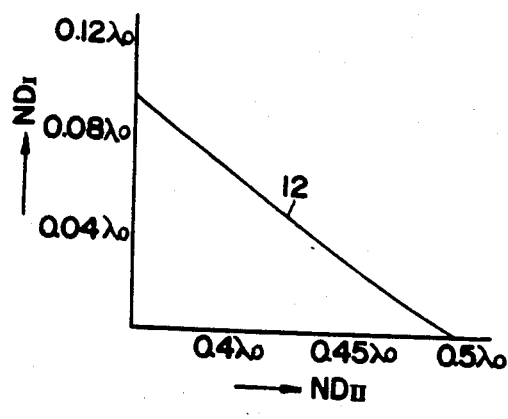
FIG. 5 shows the relationship between the thickness of a basic layer and an inhomogeneity adjusting layers which constitute a composite layer.
Figure 6:
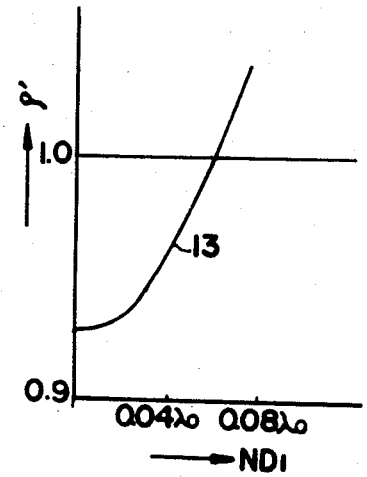
FIG. 6 shows the relationship between the thickness of the inhomogeneity adjusting layer and an equivalent inhomogeneity.

In FIG. 5, $ND_{II}$ and $ND_I$ represents respectively thicknesses of the basic and inhomogeneity adjusting layers. Further, a relationship between R'mins and the thicknesses of the inhomogeneity adjusting layers is similarly established. Since $\phi'$ is given by the equation 4, a relationship between $\phi'$ and the thicknesses of the inhomogeneity adjusting layers is also established. A curve 13 in FIG. 6 shows this relationship.

Thus, it will be understood that if any value of $\phi'$ is selected and indices of the basic and inhomogeneity adjusting layers are determined, the thicknesses of these layers providing the specific value of $\phi'$ can be obtained. In other words, any $\phi'$ can be obtained by selecting thicknesses of the basic and inhomogeneity adjusting layers.

This fact in the composite layer is greatly in contrast to that in the single layer because the inhomogeneity $\phi$ of the single layer can not be freely changed.

Figure 8:
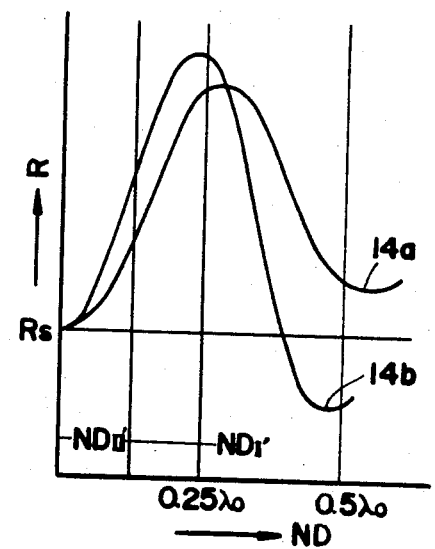
FIG. 8 shows reflectance of coatings.

An optical component shown in FIG. 7 is composed of a substrate 8, an inhomogeneity adjusting II' and a basic layer I'. With respect to this optical component, the above mentioned calculations are conducted and thus a reflectance curve 14a shown in FIG. 8 is obtained. Curves 14a and 14b respectively represent reflectances of optical component having inhomogeneity adjusting layers made of different materials.

The curve 14a shows reflectances of a composite layer in which refractive indeces $N_I'$ of a basic layer I' is higher than that $N_{II}'$ of an inhomogeneity adjusting layer II', while the curve 14b shows reflectances of a composite layer in which refractive indeces $N_I'$ of a basic layer I' is lower than that $N_{II}'$ of an inhomogeneity adjusting layer II'. Calculations with respect to several optical elements with basic and inhomogeneity adjusting layers having various combinations of thicknesses are conducted. As a result, curves corresponding to curves 12 and 13 in FIG. 5 and FIG. 6 can be obtained and hence a composite layer having any desired equivalent inhomogeneity $\phi'$ can be obtained.

This invention resides in the use of the composite layer for anti-reflection coatings. The composite layer is used as $\lambda o/2$ layer of two and three layer anti-reflection coatings.

It is known that the equivalent inhomogeneity $\phi'$ samely contributes to anti-reflection performance of the two and three layer anti-reflection coating as the inhomogeneity $\phi$. Although the composite layer does not have a thickness of $\lambda o/2$ as mentioned above, the composite layer is called a "$\lambda o/2$ composite layer" because the composite layer has the same optical effect in the anti-reflection coatings as that of the $\lambda o/2$ layer of conventional anti-reflection coatings. It was found through calculation that the composite layer may have a thickness within a range of 0.4 $\lambda o$ to 0.6 $\lambda o$. The value of the equivalent inhomogeneity $\phi'$ is determined in accordance with the required reflectance at a middle zone of a wave length band, width of the wave length band in which reduction of reflectance is required, refractive index of the substrate and so forth. In any case, the equivalent inhomogeneity $\phi'$ greater than the inhomogeneity $\phi$ gives more excellent anti-reflection performance. The equivalent inhomogeneity $\phi'$ should have a value defined by the following relationship 5.

$$\phi < \phi' < 1.2 \qquad 5$$

If $\phi'$ is greater than 1.2, reflectance at a middle zone of a wave length band where reduction of reflectance is required, increases again.

In the relationship 5, $\phi$ and $\phi'$ should mean as follows:

$\phi$ is the inhomogeneity of a single layer of zirconium oxide deposited on a substrate and having a higher refractive index than that of the substrate and a thickness of $\lambda o/2$; and $\phi'$ is the equivalent inhomogeneity of a composite layer consisting of a basic layer and an inhomogeneity adjusting layer wherein the basic layer is deposited with the same material and under the same conditions as these for the single layer. The conditions include temperature, degree of vacuum and gas substance in a vacuum deposition chamber, rate of deposition, material of the substrate and material or materials to be deposited.

The inhomogeneity adjusting layer may be a single layer or a composite layer. The composite inhomogeneity adjusting layer can be formed on the basis of known equivalent film theories, for example, by L. I. Epstein: Journal of Optical Society of America, Vol. 42, Page 806 (1952). An embodiment of this invention has a composite inhomogeneity adjusting layer in which two sandwitching sublayers are of the same material as that of the basic layer.

Now, the present invention is described in detail by way of some concrete embodiments.

Figure 9:
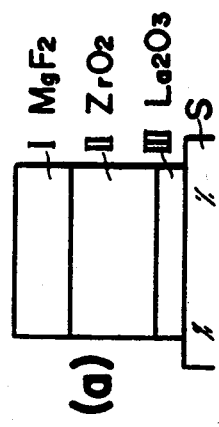
Figure 9:
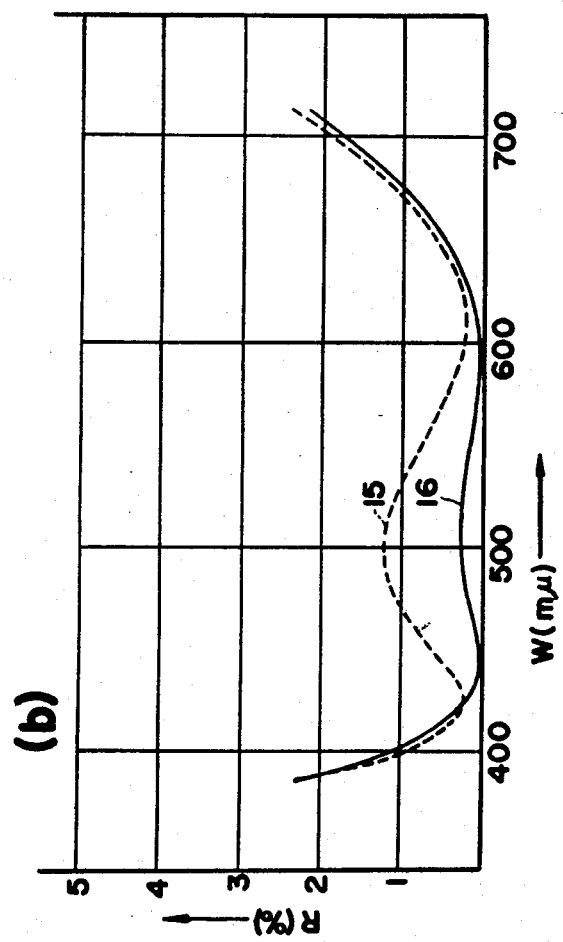

Referring to FIGS. 9 (a) and (b), there is shown a first embodiment of the two layers type anti-reflection coating. Details of the embodiment are shown in Table 1.

TABLE 1

|  | First layer | Second layer | Third layer |
|---|---|---|---|
| Optical thickness ND | 0.25$\lambda_o$ | 0.412$\lambda_o$ | 0.15$\lambda_o$ |
| Refractive index | 1.38 | 2.05 | 1.80 |
| Evaporation material | MgF$_2$ | ZrO$_2$ | La$_2$O$_3$ |

Ns = 1.52
$\lambda$ = 500 m$\mu$

In this embodiment, the second and third layers constitute a $\frac{1}{2}\lambda o$ composite layer, in which the second layer is a basic layer and the third layer is an inhomogeneity adjusting layer.

$$\phi = 1$$

In FIG. 9 the curve 16 shows the reflectance of this embodiment and the curve 15 shows the reflectance of, an optical component coated with conventional two layer anti-reflection coating containing a single $\frac{1}{2}\lambda o$ layer of zirconium oxide. It will be apparent from FIG. 9 that the anti-reflection coating of this invention exhibits excellent anti-reflection performance.

This anti-reflection coating is not subjected to heat treatment. Hence, the second layer of $ZrO_2$ (basic layer) is homogeneous as shown in the Table 1. Even if the basic layer is homogeneous, anti-reflection performance is improved by a composite layer structure of the $\lambda o/2$ layer.

FIGS. 10 (a) and (b) show a second embodiment of this invention. Details of this invention as shown in Table 2.

TABLE 2

|  | First layer | Second layer | Third layer |
|---|---|---|---|
| Optical thickness ND | 0.25 λ. | 0.408 λ. | 0.18 λ. |
| Refractive index | 1.38 | See Note (1) | 1.8 |
| Evaporation material | $MgF_2$ | $ZrO_2$ | $La_2O_3$ |

Ns = 1.52
λ. = 500 mμ
Note (1): When the thickness of the second layer is Na = 1.965, Nb = 2.1 and inhomogeneity ρ = 0.93

Also in this embodiment, the second and third layers constitute a composite $\frac{1}{2}\lambda o$ layer.

A curve 18 shows reflectances of an anti-reflection coating according to this invention, while a curve 17 shows reflectances of an conventional anti-reflection coating in which the second and third layers are replaced by a layer of $ZrO_2$.

It will be apparent from FIG. 10 that the second embodiment exhibits excellent anti-reflection performance.

Figure 12:
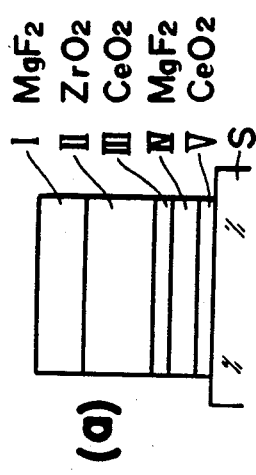
Figure 12:
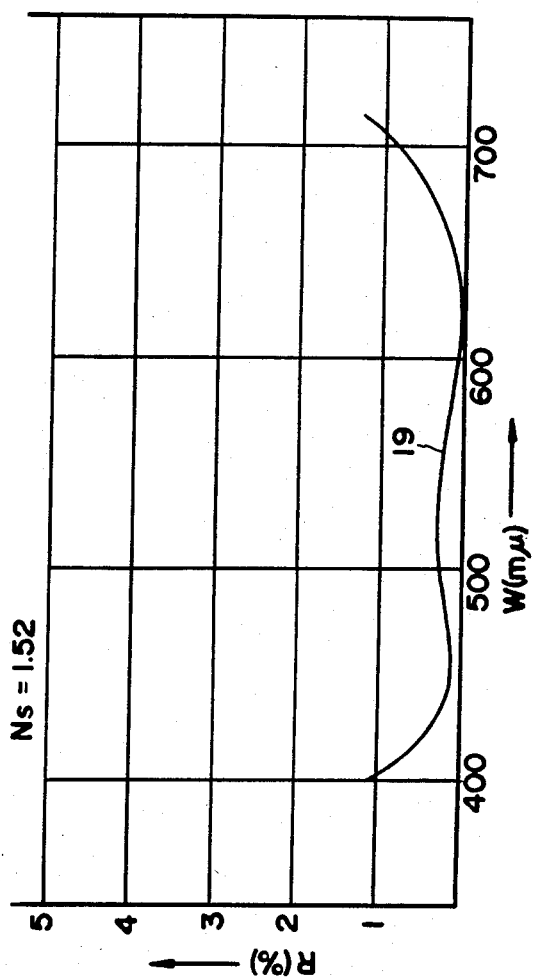

FIGS. 12 (a) and (b) show an third embodiment of this invention and details of this embodiment are shown in Table 3.

TABLE 3

|  | Ist layer | IInd layer | IIIrd layer | IVth layer | Vth layer |
|---|---|---|---|---|---|
| Optical thickness | 0.25 λ. | 0.408 λ. | 0.059 λ. | 0.058 λ. | 0.059 λ. |
| Refractive index | 1.38 | Note(1) | 2.15 | 1.38 | 2.15 |
| Evaporation material | $MgF_2$ | $ZrO_2$ | $CeO_2$ | $MgF_2$ | $CeO_2$ |

Ns = 1.52
λ. = 500 mμ

This embodiment is of the two layers anti-reflection coating type, in which embodiment the third, fourth and fifth layers constitute the inhomogeneity adjusting layer.

These three layers are deemed as a single layer by a theory of three-layers equivalent film, which layers are named as a three-layers equivalent film.

When used the three-layers equivalent film, there is a merit that a desired refractive index of the inhomogeneity adjusting layer can be easily obtained.

How to determine the refractive index of the three-layers equivalent film was explained in FIGS. 11 (a) and (b).

In FIG. 11, $N_H = 2.15$ ($CeO_2$) and $N_L = 1.38$ ($MgF_2$). By changing the thickness ($ND_L$) of the intermediate layer ($N_2$), while the thicknesses ($ND_H$) of the sandwiching layers ($N_H$) is left at a certain value, the total refractive index (equivalent refractive index Nq) of the three-layers equivalent film is changed as shown by a curve in FIG. 11 (b). It will be apparent from FIG. 11 (b) that the desired refractive index can be obtained by selecting a thickness of the intermediate layer.

Figure 13:
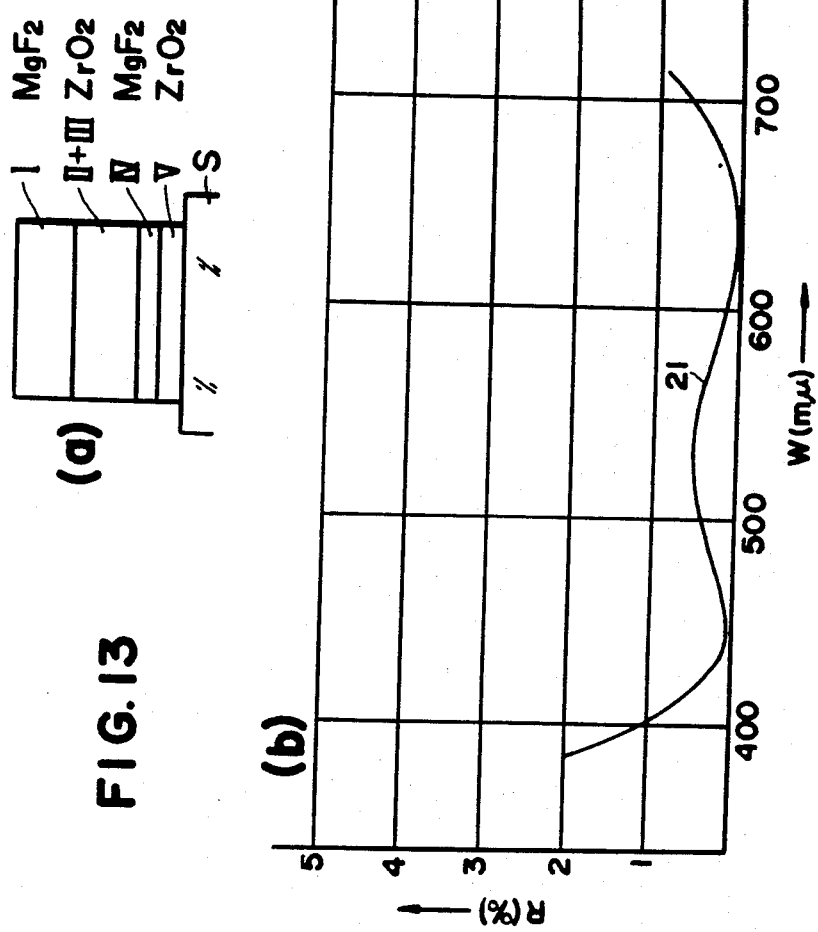

FIG. 13 shows a fourth embodiment of this invention and details of this invention are shown in Table 4.

TABLE 4

|  | Ist layer | IInd layer | IIIrd layer | IVth layer |
|---|---|---|---|---|
| Optical thickness | 0.25 λ. | 0.474 λ. | 0.047 λ. | 0.065 λ. |
| Refractive index | 1.38 | Note (1) | 1.38 | 2.05 |
| Evaporation material | $MgF_2$ | $ZrO_2$ | $MgF_2$ | $ZrO_2$ |

Ns = 1.52
λ. = 500 mμ

Also in this embodiment, the three equivalent film is used as the inhomogeneity adjusting layer. The three layer equivalent film is composed of a part of the second layer and the third and fourth layers. In other word, the second layer constitute not only the basic layer but also a part of the inhomogeneity adjusting layer.

Figure 14:
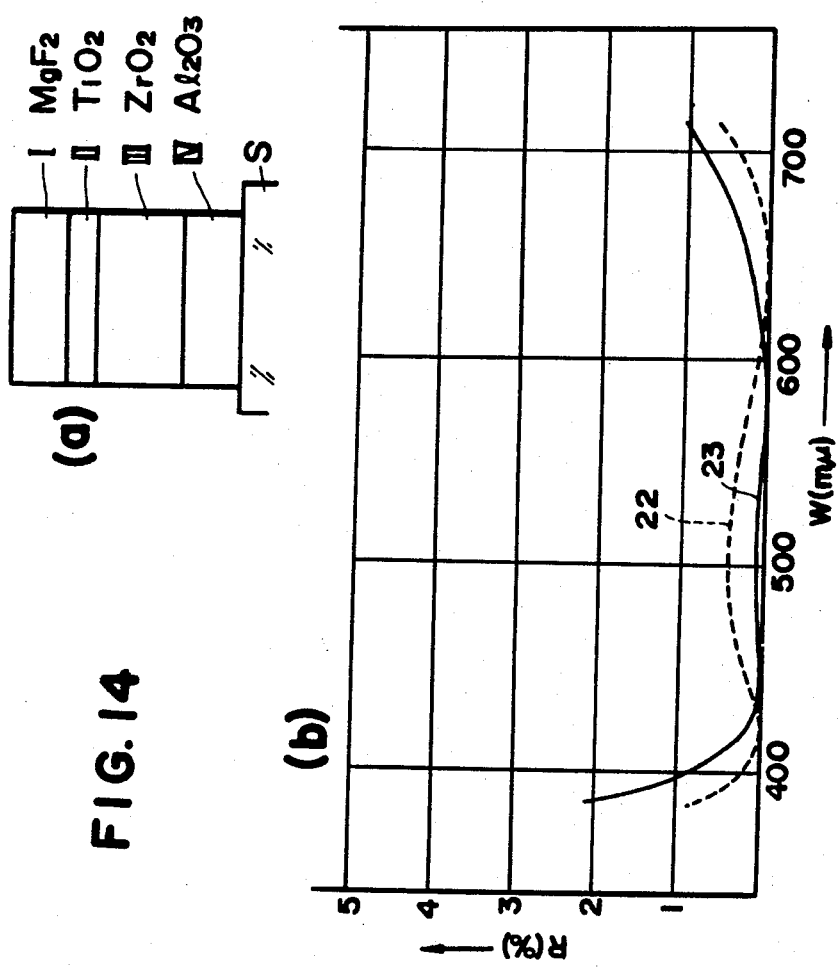

FIG. 14 shows a fifth embodiment of this invention and details of this embodiment are shown in Table 5.

TABLE 5

|  | Ist layer | IInd layer | IIIrd layer | IVth layer |
|---|---|---|---|---|
| Optical thickness ND | 0.25 λ. | 0.064 λ. | 0.354 λ. | 0.25 λ. |
| Refractive index | 1.38 | 2.30 | Note (1) | 1.65 |
| Evaporation material | $MgF_2$ | $TiO_2$ | $ZrO_2$ | $Al_2O_3$ |

Ns = 1.52
λ. = 540 mμ

This embodiment is of the three layer anti-reflection coating type. The second and third layers constitute the $\frac{1}{2}\lambda o$ composite layer, the second layer is the inhomogeneity adjusting layer and the third layer is the basic layer.

A curve 23 shows reflectances of an anti-reflection coatings according to this invention, while a curve 22 shows reflectances of a conventional anti-reflection coating in which the second and third layers are replaced by a $\lambda o/2$ layer of $ZrO_2$. As shown in FIG. 14, reflectances are effectively reduced in this invention.

In the 6th embodiment, the refractive index Ns of a substrate = 1.72 and particulars of the respective layers are as shown in Table 6 below.

TABLE 6

|  | Ist layer | IInd layer | IIIrd layer | IVth layer | Vth layer |
|---|---|---|---|---|---|
| Optical film thickness | 0.25 λ. | 0.408 λ. | 0.059 λ. | 0.03 λ. | 0.059 λ. |
| Refractive index | 1.38 | Note(1) | 2.15 | 1.38 | 2.15 |
| Evaporation material | $MgF_2$ | $ZrO_2$ | $CeO_2$ | $MgF_2$ | $CeO_2$ |

Ns = 1.72
λ. = 500 mμ

Figure 15:
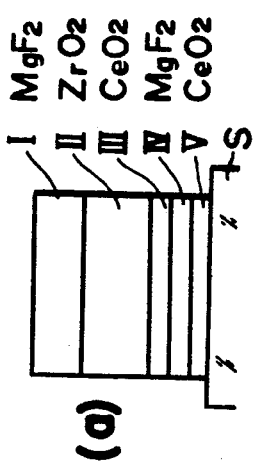
Figure 15:
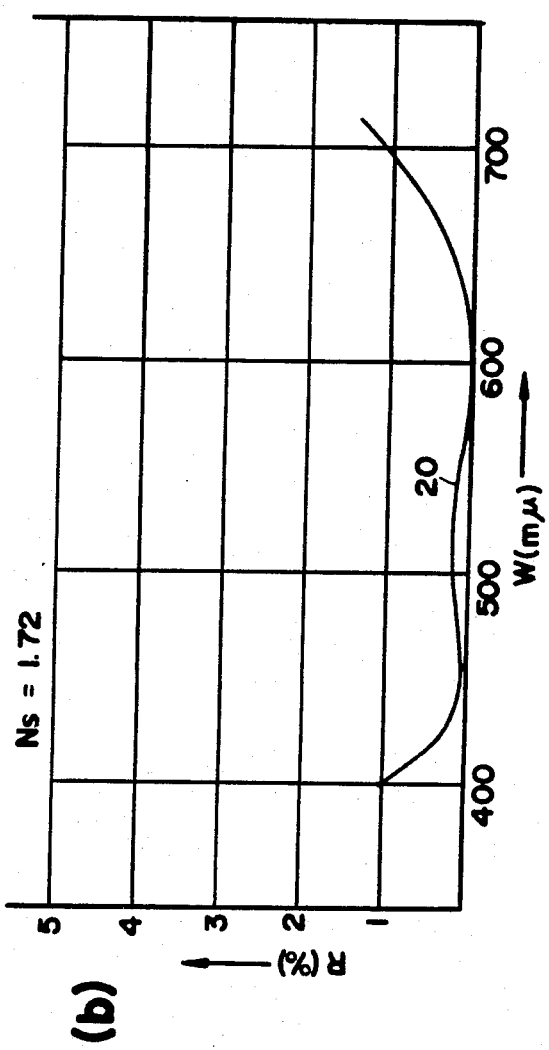

The third and 6th embodiments are substantially identical in constitution except for difference in thickness of the IVth layer. They are also almost equal in performance as noticed from curve 19 and 20 in FIG. 12 (b) and FIG. 15 (b). This is indicative of the fact that the anti-reflection film obtained by applying the principles of the present invention to a known 2-layer anti-reflection film has extremely high quality, whereby even when the refractive index of the substrate is changed, an equally high performance can be obtained by merely changing thickness of the IVth layer.

What is claimed is:
1. An antireflective coating for the transparent substrate of an optical component, in which said coating comprises at least two layers, one of which has a thickness of approximately $\lambda/4$ and the other a thickness of approximately $\lambda/2$, and in which said $\lambda/2$ layer is a composite layer comprising a basic layer and at least one inhomogeneity adjusting layer, wherein $\lambda$ is the wavelength lying within the band of wavelengths in which reflectances are to be reduced; characterized in that (1) said basic layer has a thickness greater than said inhomogeneity adjusting layer, (2) said composite layer has a reflectance of R'min, wherein R'min is the minimum reflectance which is caused at approximately $\lambda/2$ thickness of the layer measured when only said composite layer is formed on a substrate having a lower refractive index than said composite layer, and (3) said composite layer has an equivalent inhomogeneity $\phi'$ having a value defined by the relationship $$\phi < \phi' < 1.2$$

wherein:

$\phi$ is the inhomogeneity of said substrate and said basic layer having a thickness of $\lambda/2$ and is defined by the equation $$\rho = \frac{1 + \sqrt{R\ min}}{Ns(1 - \sqrt{R\ min})};$$

$\phi'$ is defined by the equation:

$$\rho' = \frac{1 + \sqrt{R'\ min}}{Ns(1 - \sqrt{R'\ min})}$$

wherein:

R min is the minimum reflectance of the optical component at thickness of $\lambda/2$, $N_s$ is the refractive index of said substrate; and said basic layer is composed of zirconium oxide.

2. An antireflective coating according to claim 1, in which said inhomogeneity adjusting layer is interposed between said basic layer and said optical component.

3. An antireflective coating according to claim 2, in which said inhomogeneity adjusting layer comprises three superimposed layers.

4. An antireflective coating according to claim 3, in which said three superimposed layers are respectively formed of $CeO_2$, $MgF_2$, and $CeO_2$.

5. An antireflective coating according to claim 2, in which said inhomogeneity adjusting layer comprises two superimposed layers.

6. An antireflective coating according to claim 5, in which said two superimposed layers are respectively formed of $ZrO_2$ and $MgF_2$ in that order as viewed from the optical component side.

7. An antireflective coating according to claim 1, in which said coating further comprises a third layer having a thickness of approximately $\lambda/4$, said third layer being interposed between said composite layer and said optical component.

8. An antireflective coating according to claim 7, in which said basic layer is superimposed on said inhomogeneity adjusting layer and said third layer is superimposed on said basic layer in that order as viewed from the air side.

9. An antireflective coating according to claim 8, in which said inhomogeneity adjusting layer is formed of $TiO_2$ and said third layer is formed of $Al_2O_3$.

* * * * *